United States Patent

Evans

[15] 3,657,525
[45] Apr. 18, 1972

[54] DIRECT FEED RATE CONTROL CIRCUIT

[72] Inventor: John T. Evans, Waynesboro, Va.

[73] Assignee: General Electric Company

[22] Filed: Mar. 17, 1970

[21] Appl. No.: 20,339

[52] U.S. Cl..........................................235/151.11, 318/571
[51] Int. Cl........................................G05b 19/14, H02p 7/42
[58] Field of Search...............................235/151.11; 318/571

[56] References Cited

UNITED STATES PATENTS

3,479,574  11/1969  Kosem..........................235/151.11 X
3,530,283  9/1970  McDaniel.....................235/151.11 X

*Primary Examiner*—Eugene G. Botz
*Attorney*—William S. Wolfe, Frank L. Neuhauser, Oscar B. Waddell and Joseph B. Forman

[57] ABSTRACT

Control of the rate of motion is provided for a numerical control system utilizing a direct feed rate form of programming. Command pulse trains produced for each axis of motion and a velocity command pulse train representing the programmed velocity of the resultant path of motion are applied to a circuit which indicates a difference resulting from subtracting the sum of the squares of the number of pulses in the individual axis command pulse trains from the sum of the square of the number of pulses in the velocity pulse train over a period of time. The difference is used to control the rate of generation of the axis pulse trains so as to approach zero difference.

9 Claims, 14 Drawing Figures

INVENTOR.
JOHN T. EVANS
BY Michael Masnik
HIS ATTORNEY

INVENTOR.
JOHN T. EVANS
BY Michael Masnik
HIS ATTORNEY

| PRIMARY | SECONDARY | C/B INPUT | S/D | C/B OUTPUT ADD | C/B OUTPUT SUBT. |
|---|---|---|---|---|---|
| 0 | 0 | 0 | 0 | 0 | 0 |
| 1 | 0 | 0 | 1 | 0 | 0 |
| 0 | 1 | 0 | 1 | 0 | 1 |
| 1 | 1 | 0 | 0 | 1 | 0 |
| 0 | 0 | 1 | 1 | 0 | 1 |
| 1 | 0 | 1 | 0 | 1 | 0 |
| 0 | 1 | 1 | 1 | 1 | 1 |
| 1 | 1 | 1 | 0 | 1 | 1 |

FIG. 8b

| J | K | Q BEFORE CLOCK PULSE | Q AFTER CLOCK PULSE |
|---|---|---|---|
| 0 | 0 | 0 | 0 |
| 0 | 0 | 1 | 1 |
| 0 | 1 | 0 | 0 |
| 0 | 1 | 1 | 0 |
| 1 | 0 | 0 | 1 |
| 1 | 0 | 1 | 1 |
| 1 | 1 | 0 | 1 |
| 1 | 1 | 1 | 0 |

FIG. 6

INVENTOR.
JOHN T. EVANS
BY Michael Masnik
HIS ATTORNEY

DIRECT FEED RATE CONTROL CIRCUIT

BACKGROUND OF THE INVENTION

This invention relates to the numerical control of velocity. More specifically, it relates to numerical control of the velocity of motion of a machine element relative to a workpiece.

In the numerical control of machine tools the desired motion of a cutting element relative to a workpiece is described by a program of commands in digital form typically entered into a control system via punched tape or any other conventional means. One class of numerical control systems is numerical "contouring" controls which are also described as "continuous path" controls. In a numerical contouring system the input data to the control system must contain information describing both the velocity, also known as feed rate, and the path of the relative motion of the cutting element to the workpiece. In one commonly used form of input data, velocity information is contained in a "feed rate number." Feed rate numbers must be laboriously calculated by a programmer prior to inclusion in the program, or expensive time must be consumed on a computer to provide calculated feed rate numbers. The feed rate number is inversely proportional to the time required to complete the command to which it applies. This form of input data program is therefore referred to as an inverse time form of programming. A circuit which avoids feed rate number programming and which allows the velocity information in the programmed data to be programmed directly in velocity units, rather than inverse time units, is described in U.S. Pat. No. 3,428,876, issued Feb. 18, 1969 to Leroy U. C. Kelling, and assigned to the General Electric Company which is also assignee of the present application. While the apparatus of the cited patent provides accurate and reliable operation, it utilizes an approximation in generating pulse trains which command the actual velocity of the relative motion in response to programmed information.

SUMMARY OF THE INVENTION

It is a general object of the present invention to provide an improved velocity or feed rate control for a numerical control system, which can accept input data containing velocity information programmed directly in velocity units, and can control the velocity of motion in two or three dimensions on a path of any form.

It is a more specific object of the present invention to provide a feed rate control circuit of the type described in which circuitry is provided for implementing a mathematically exact algorithm for generating pulse trains which command the actual velocity of the relative motion in response to programmed information.

Operation of the automatic machine tool proceeds in response to blocks of data in the program. A block of data is a unit of information containing instructions for a discrete portion of the cutting operation.

It is another object of the present invention to provide a control system of the type described in which the correspondence of average actual velocity to average programmed velocity improves as the system progresses through performance of the operation commanded by each block of data.

It is a specific object in one form of the present invention to provide a control system of the type described in which a further pulse train is produced whose average pulse rate is indicative of the average resultant velocity actually being commanded.

Briefly stated, in accordance with the present invention, there is provided a direct feed rate control circuit for a numerical control system adapted for use with a form of programming in which the velocity of a machine element relative to a workpiece is programmed directly in units of velocity. In the context of automatic machine tools, such velocity is commonly known as feed rate. A velocity command signal is applied to the direct feed rate control circuit of the present invention. The velocity command signal consists of a pulse train indicative of programmed information with each pulse corresponding to an increment of relative motion and the pulse repetition rate being indicative of the programmed velocity. The direct feed rate control circuit produces an output comprising an iterative command signal which is applied to a circuit known as a function generator. The function generator produces individual axis command pulse trains each indicative of a component of motion along one orthogonal axis of the automatic machine tool being commanded. The function generator controls the proportion of the number of pulses in each axis command pulse train relative to the others.

Over a certain period of time, the sum of the squares of the integrals of the individual axis command pulse trains (which is equal to the sum of the squares of the axis departure distances relative to a reference point, updated with each command pulse, during that "period of time") is subtracted from the square of the integral of the velocity command pulse train indicative of programmed velocity (which is equal to the square of the total commanded distance, updated with each pulse, during that "period of time"). Any lack of equality, indicated by a non-zero difference, causes the rate of generation of pulses in the axis command trains to be modified in such direction as to make the result more nearly zero. When, due to the continual integration of the pulse trains, the numbers involved in the foregoing algorithm become too large for the capacity of the registers, the end of the "period of time" is indicated and the registers containing the distance changes and the difference of squares are cleared and a new "period of time" (or computational interval) involving the same algorithm is initiated.

BRIEF DESCRIPTION OF THE DRAWINGS

The features of novelty which characterize the present invention and achieve the foregoing objects are pointed out with particularity in the claims forming the concluding portion of the specification. For a further understanding of the invention, its advantages, and objects attained with its use, reference should be had to the following description taken in connection with the following drawings:

DESCRIPTION OF THE PREFERRED EMBODIMENTS

General

Figure 1:
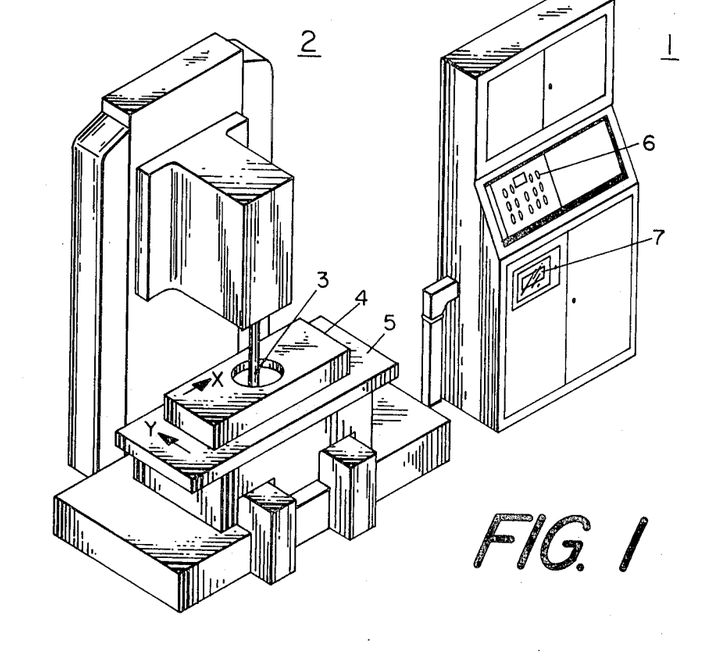
FIG. 1 is an illustration of a numerical control system including a machine tool and a control console housing numerical control circuitry.

FIG. 1 is illustrative of a numerical control system including a control console 1 and an automatic machine tool 2. The automatic machine tool 2 carries a cutting tool 3 to perform desired operations on a workpiece 4 which is mounted on a bed 5. The desired cutting operations are performed by moving the cutting tool 3 in relation to the workpiece 4 in response to programmed instructions. The relative motion between the cutting tool 3 and the workpiece 4 is referred to as the motion of the automatic machine tool. The programmed instructions are provided to the control console 1 in any of several conventional ways. For example, programmed instructions may be entered by setting thumbwheel switches 6, by a punched paper tape 7, or directly from a computer output (not shown).

Many forms of machining operations may be controlled by the control console 1. By way of illustration, the automatic machine tool 2 is shown to include a cutting tool 3 comprising a milling cutter. The direct feed rate control circuit of the present invention is adaptable for use in a numerical control system in which motion is programmed along any number of mutually perpendicular axes, the physical limitation of the number of these axes of course being three. For simplicity, the circuitry is described with reference to a system in which motion along two axes is commanded. These axes are the X and Y axes which are perpendicular and lie in the horizontal plane as seen in FIG. 1. The X and Y components of motion which comprise the resultant motion of the automatic machine tool are produced by servomotors 37 and 47 (FIG. 2) which are included in the automatic machine tool 2. The motion of the automatic machine tool may comprise motion along one axis by the cutting tool 3 and motion along one axis by the workpiece 4, or motion along both of the orthogonal axes by either.

Numerical Control Circuitry

Figure 2:
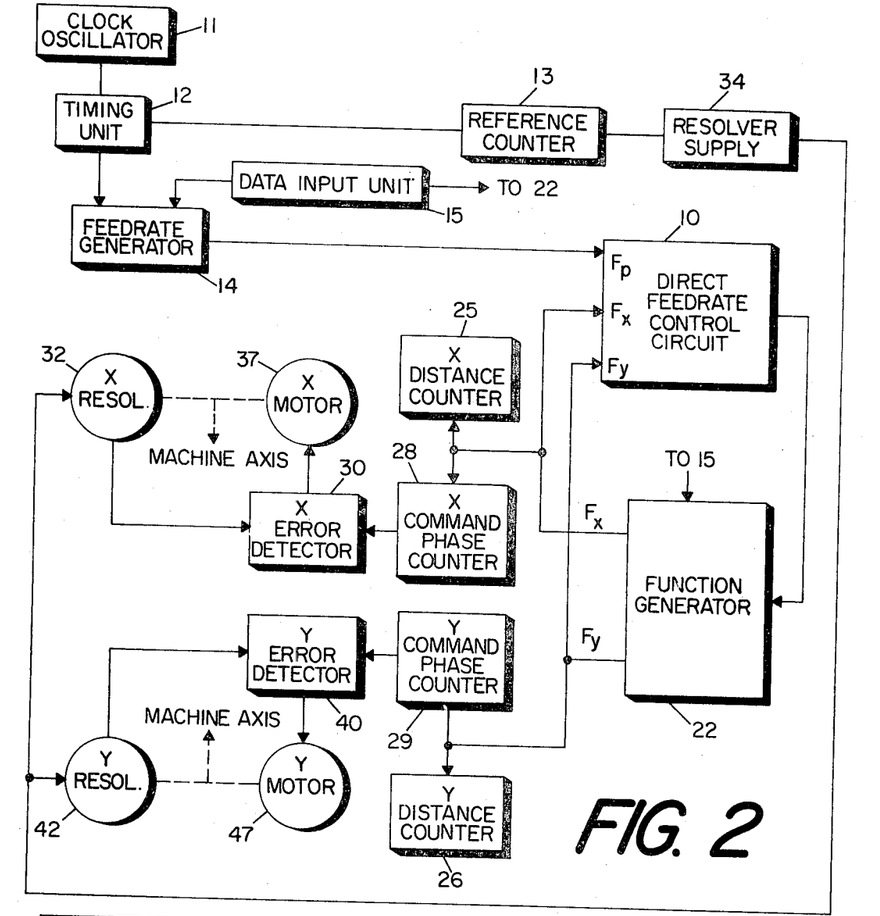
FIG. 2 is a block-diagrammatic illustration of a numerical control circuit including a direct feed rate control circuit constructed in accordance with the present invention.

FIG. 2 is a block diagrammatic representation of a numerical control circuit including a direct feed rate control circuit 10 constructed in accordance with the present invention. Program information is provided to a feed rate generator 14 which provides an output to a function generator 22. The function generator 22 performs an iterative mathematical function to provide individual axis command pulse trains consisting of $F_x$ and $F_y$ pulses for commanding the motion of X and Y servomotors 37 and 47.

In some prior forms of numerical control systems, the program information is arranged such that the output of the feed rate generator 14 comprises a signal indicative of a feed rate number, i.e., a number inversely proportional to the time required to move the automatic machine tool through the distance called for by the block of data. In a control system incorporating the present invention, direct feed rate programming may be utilized. More specifically, the desired velocity of movement of the automatic machine tool may be directly programmed so that the feed rate generator 14 produces an output which will be referred to as a velocity command pulse train. The direct feed rate control circuit 10 provides an output which will be referred to as an iterative command signal to control the rate at which the function generator 22 iterates.

Since the present invention operates in the context of a conventional numerical control circuit, the conventional circuitry is briefly described prior to a detailed description of the direct feed rate control circuit 10. A more complete description of the general aspects of the numerical control circuitry may be found in U.S. Pat. No. 3,173,001 to John T. Evans, assigned to the General Electric Company, which is also assignee of the present application.

The circuitry of FIG. 2 is synchronized by a clock oscillator 11, which may be, for example, a crystal controlled oscillator. The clock oscillator 11 serves as both a time base for the numerical control system and as a source of pulses. A timing unit 12 is connected to the output of the clock oscillator 11 and serves to provide a pulse train of a convenient frequency to a reference counter 13 which provides a reference phase and to a feed rate generator 14. The feed rate generator 14 is made responsive to the program by connecting it to a data input unit 15 which provides an output indicative of the programmed instructions. The feed rate generator 14 modifies the pulse train input from the timing unit 12 to provide a velocity command signal output, consisting of $F_p$ pulses, which is indicative of the velocity at which it is desired to move the automatic machine tool.

Figure 2A:
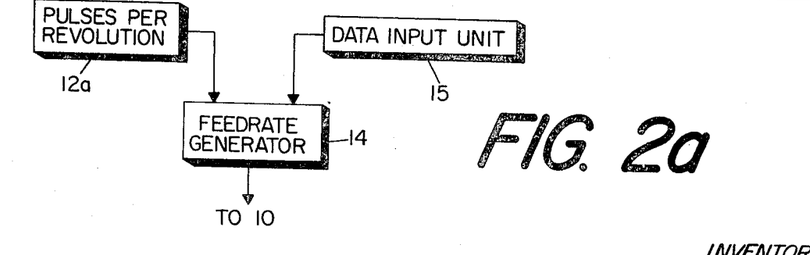
FIG. 2a is an illustration of a modification of the timing system shown in FIG. 2.

It should be noted, that the timing unit 12 and clock 11 may be replaced by a timing source 12a, shown in FIG. 2a, which produces pulses with respect to a parameter other than time. For example, the timing source 12a may be coupled to produce a fixed number of pulses for each revolution of the spindle of a lathe or other machine tool. In this manner, velocity along the machine tool axes may be programmed in terms of unit distance per spindle revolution rather than unit distance per unit time.

The function generator 22 is connected to the data input unit 15. The data input unit 15 presets the function generator 22 at the beginning on operation on a block of data to determine the proportion in which $F_x$ and $F_y$ pulses are produced. These functions may be, for example, the sine and cosine of the angle between the path of the automatic machine tool and a reference axis when motion in a straight line is programmed. The automatic machine tool may be made to travel in an arc, slope or any contour.

The $F_x$ and $F_y$ pulses from the function generator 22 are coupled to X and Y distance counters 25 and 26, which monitor the amount of motion being commanded along each axis until the requirements of the particular block of data in the program being utilized are satisfied. The outputs of the function generator 22 are also coupled to X and Y command phase counters 28 and 29. The command phase counters 28 and 29 translate these pulse train outputs to signals whose phase with respect to the reference phase is indicative of the commanded positions of the X and Y servomotors 37 and 47.

Motion of the X servomotor 37 is produced in a well-known manner by providing an error signal thereto from an X error detector 30, which compares the commanded position of the servomotor 37 to is actual position. The error detector 30 has a first input connected to the output of the X command phase counter 28 and a second input connected to the output of a resolver 32. The resolver 32 is mechanically coupled to the X servomotor 37 and produces an alternating voltage having a phase indicative of the actual position of the X servomotor 37. A resolver supply 34, connected to an output of the reference counter 13 provides an input to the resolver 32. Similarly, a Y error detector 40 has a first input from the Y command phase counter 29 and a second input from a Y resolver 42, which is mechanically coupled to the Y servomotor 37 and also has an input from the resolver supply 34. The analog output of the Y detector 40 is connected to drive the Y servomotor 42.

DIRECT FEED RATE CONTROL CIRCUIT FUNCTIONAL ANALYSIS

Figure 3:
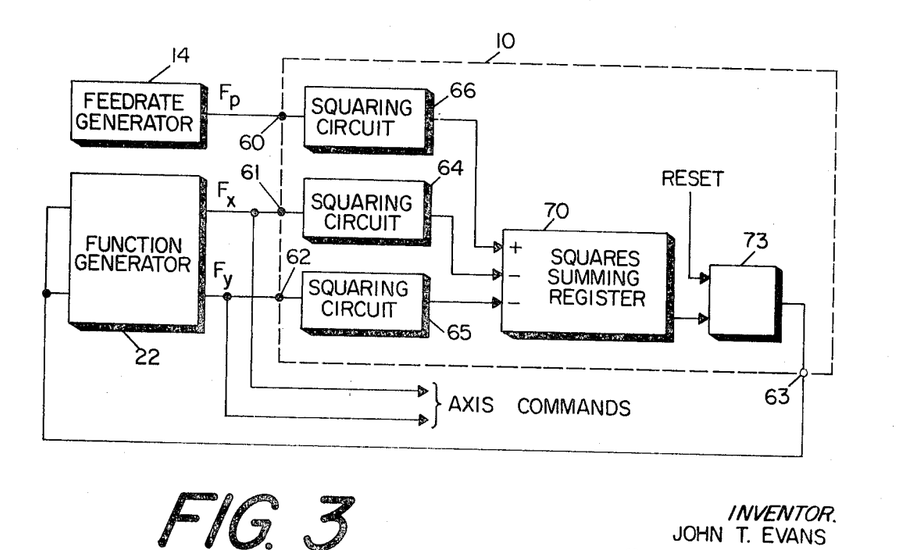
FIG. 3 is a block diagram of a basic form of the absolute direct feed rate control circuit constructed in accordance with the present invention, the block diagram including a functional representation of the squaring circuits of the control circuit.

FIG. 3 is a block diagrammatic representation of a basic form of the direct feed rate control circuit 10 of the present invention. A portion of the numerical control system of FIG. 2 is also shown. The direct feed rate control circuit 10 is illustrated having the feed rate generator 14 connected thereto at a first input terminal 60. The function generator 22 is connected to the direct feed rate control circuit 10 at other input terminals 61 and 62. The iterative command signal output is supplied from an output terminal 63 to the input terminals of the function generator 22.

The sum of the squares of the individual axis commanded velocities is equal to the square of the commanded velocity. It is noted here that the term "commanded" velocity is used to denote the resultant of the individual axis commanded velocities which are produced in response to the individual axis command pulse trains. This term is to be contrasted with the term "programmed" velocity which is the velocity which is indicated by the velocity command pulse train output of the feed rate generator 14.

For the purpose of obtaining an indication of a difference between the programmed and commanded velocities, each of the input terminals 60, 61 and 62 couple the inputs appearing thereat to squaring circuits 66, 64, and 65 respectively (described below). At this point, it is sufficient to state that the integral of the digital representation of the output of each of the squaring circuits 64, 65, and 66 is equal to the square of the number of pulses supplied to its input. The outputs are coupled to a squares summing register 70.

The outputs of squaring circuits 64 and 65 are subtracted from information contained in the squares summing register 70 indicative of a number, which will hereinafter be referred to as the number in the squares summing register 70. The output of the squaring circuit 66 is added to the number in the squares summing register 70, which number is zero at the initiation of a computational interval.

Figure 6:
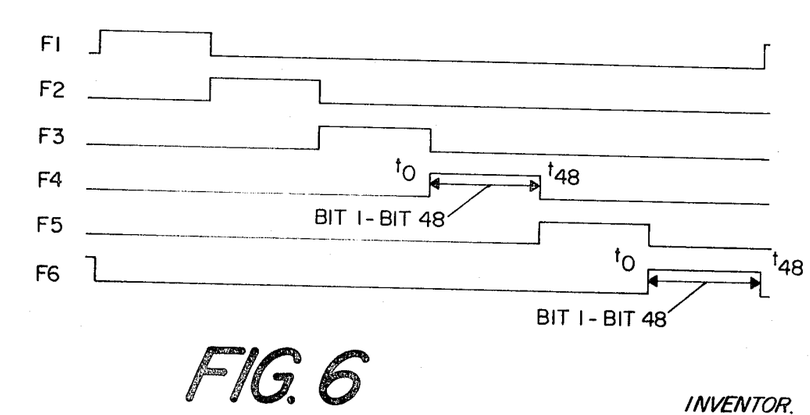
FIG. 6 is a timing chart illustrating the relationship of timing signals utilized in the embodiment of FIGS. 7a–7c.

The squares summing register 70 is connected to a first input terminal of an iterative command flip-flop 73 which also has a second input terminal connected for resetting the flip-flop 73 at the completion of each timing unit sequence (defined in the discussion of FIG. 6). The output of the flip-flop 73 comprises the iterative command signal.

A zero difference in the squares summing register 70 indicates equality of the programmed velocity to the commanded velocity, while a negative difference indicates a larger commanded velocity. In both of these cases, no output is provided from the squares summing register 70 to the flip-flop 73. A positive difference indicates a greater programmed velocity. In this situation, the squares summing register 70 provides an output to the flip-flop 73 which provides the iterative command signal at its output terminal. The provision of the iterative command signal is thus regulated by the difference between the programmed velocity and the resultant of the individual axis velocities being called for by the function generators 22. Provision of the iterative command signal permits the production of further X and Y axis command pulses by the function generator 22.

DIRECT FEED RATE CONTROL CIRCUITRY WITH SCALE OF 10 OPERATION, AND MONITORING OF COMMANDED VELOCITY

Figure 4:
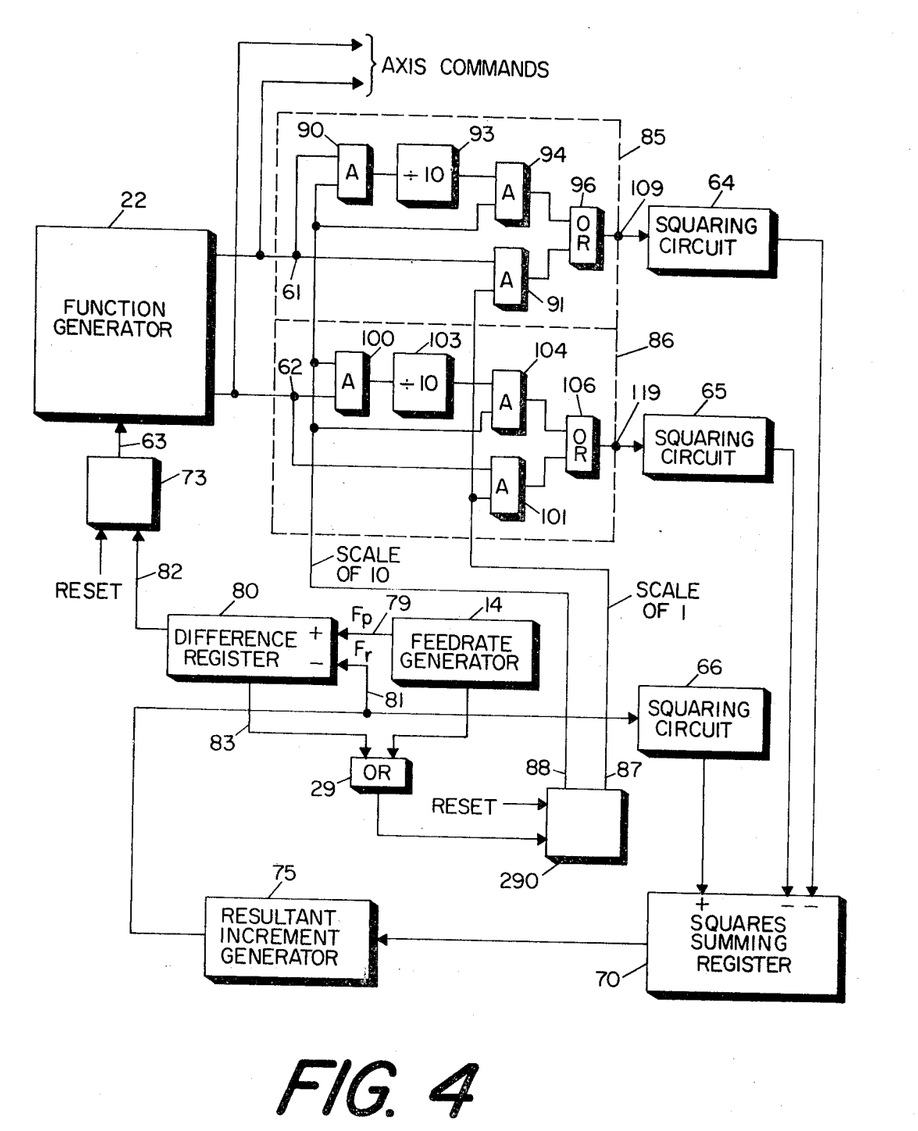
FIG. 4 is a block-diagrammatic representation of another form of the invention.

FIG. 4 is a block diagrammatic representation of a further embodiment of the present invention. The same reference numerals are used to denote circuit elements corresponding to those of FIG. 3. The circuit elements, however, are connected differently and additional elements are provided included in order to provide for scale of 10 operation and for provision of a further pulse train whose average pulse rate is indicative of the average commanded velocity.

As in the circuit of FIG. 3, the direct feed rate control circuit 10 is illustrated along with a portion of the circuitry of FIG. 2.

Scale of 10 operation is disclosed in the above-cited U.S. Pat. No. 3,428,876 to Kelling. It is a mode of operation in which the function generator 22 can produce axis command pulses to command an average rate of motion at ten times the rate obtained in scale of one operation. In scale of 10 operation, the feed rate generator 14 operation is altered so that the incremental distance represented by each $F_p$ pulse output is increased by 10. It should be noted that scaling by any factor could be provided and the factor 10 is discussed here by way of example. There are two basic reasons for using scale of 10 operation. The first is that magnitude of the programmed velocity is so large that the function generator 22 cannot produce pulses at a sufficient rate to command a velocity equal to the programmed velocity. A second reason is that the programmed velocity may be higher than that which can be indicated by the velocity command pulse train output of the feed rate generator 14.

In the circuit of FIG. 4 a resultant increment generator 75 for generating a resultant feed rate signal consisting of $F_r$ pulses is connected to the output of the summing register 70. The circuit of FIG. 4 differs from the circuit of FIG. 3 in that it is the $F_r$ output of the resultant increment generator 75 which is connected to the squaring circuit 66 via the input terminal 60 rather than the $F_p$ output of the feed rate generator 14.

The feed rate generator 14 is instead connected to a first input terminal 79 of a difference register 80. The resultant increment generator 75, as well as having an output connected to the squaring circuit 66, is connected to a second input terminal 81 of the difference register 80. The difference register 80 has a first output terminal 82 connected to control the iterative command flip-flop 73. Once again, the iterative command signal output appears at the terminal 63 and is connected to the function generator 22.

The arrangement of FIG. 4 also differs from that of FIG. 3 in that scale control circuits 85 and 86 are respectively connected between the input terminal 61 and squaring circuit 64 and between the input terminal 62 and the squaring circuit 65. The scale control circuits 85 and 86 couple $F_x$ and $F_y$ increments to the squaring circuits 64 and 65. The $F_x$ and $F_y$ increments comprise the X and Y axis command pulse trains and have the same value as the commands applied to the terminal 61 or 62 for scale of one operation, and each increment in scale of 10 operation represents ten times the distance represented by an increment in scale of one operation.

Scale Control Circuitry

The scale at which the scale control circuits 85 and 86 operate is made responsive to the presence of an inordinately large number in the difference register 80 by coupling the output at an output terminal 83 of the difference register 80 to an OR gate 291. The output of the OR gate 291 is connected to an input of a flip-flop 290 (described with respect to FIG. 8) having output terminals respectively comprising scale of one and scale of 10 control terminals 87 and 88. The scale of operation is made responsive to an excessive programmed velocity by coupling an appropriate output from the feed rate generator 14 to the OR gate 291. When no input is provided to the flip-flop 291, it provides a scale of one control signal at the terminal 87. An input sets the flip-flop 291, and a scale of 10 control signal is provided at the terminal 88. The flip-flop 291 is reset at the end of operation on a block of data.

In the representation of FIG. 4, pulses are coupled from the input terminal 61 to input terminals of first and second AND gates 90 and 91 of the scale control circuit 85. The AND gate 90 also has an input terminal connected to the scale of ten control terminal 88, and the AND gate 91 also has an input terminal connected to the scale of one control terminal 87. The output of the AND gate 90 is connected to a pulse divider 93 having its output connected to one input of an AND gate 94. The other input of the AND gate 94 is also connected to the scale of 10 control terminal 88. Both AND gates 91 and 94 have their outputs connected to an OR gate 96, the output of which is coupled to the squaring circuit 64. Similarly, the input terminal 62 couples $F_y$ pulses to AND gates 100 and 101, which also have inputs connected to the terminals 87 and 88 respectively. The AND gate 101 is connected to a pulse divider 103. The pulse divider 103 provides an output to an AND gate 104 also having an input terminal connected to the terminal 88. Both the AND gates 104 and 101 are connected to an OR gate 106, coupled to the Y squaring circuit 65.

When the number in the difference register 80 and the programmed velocity are below predetermined levels, the flip-flop 291 is in a reset state. This renders the AND gate 90 nonconductive and also renders the AND gate 91 conductive. $F_x$ pulses are coupled from the terminal 61 through the AND gate 91 and OR gate 96 to the squaring circuit 64. When the number in the difference register 80 equals or exceeds a predetermined number or when velocity commanded by the feed rate generator 14 is so large as to indicate that the numerical control circuit cannot "keep up" with the commanded velocity, the flip-flop 290 is set. This places the numerical control circuit in scale of 10 operation. The AND gate 91 becomes nonconductive, and the AND gate 90 becomes conductive $F_x$ pulses are coupled from the terminal 61 through the AND gate 90, divided by the divider 93 and coupled to the AND gate 94. The AND gate 94 is also rendered conductive at this time and couples increments through the OR gate 96 to the squaring circuit 64. Similarly, the AND gate 100 couples $F_y$ pulses to the pulse divider 103, and gate 104 and OR gate 106 to the squaring circuit 65.

Squaring Circuits

Figure 7A:
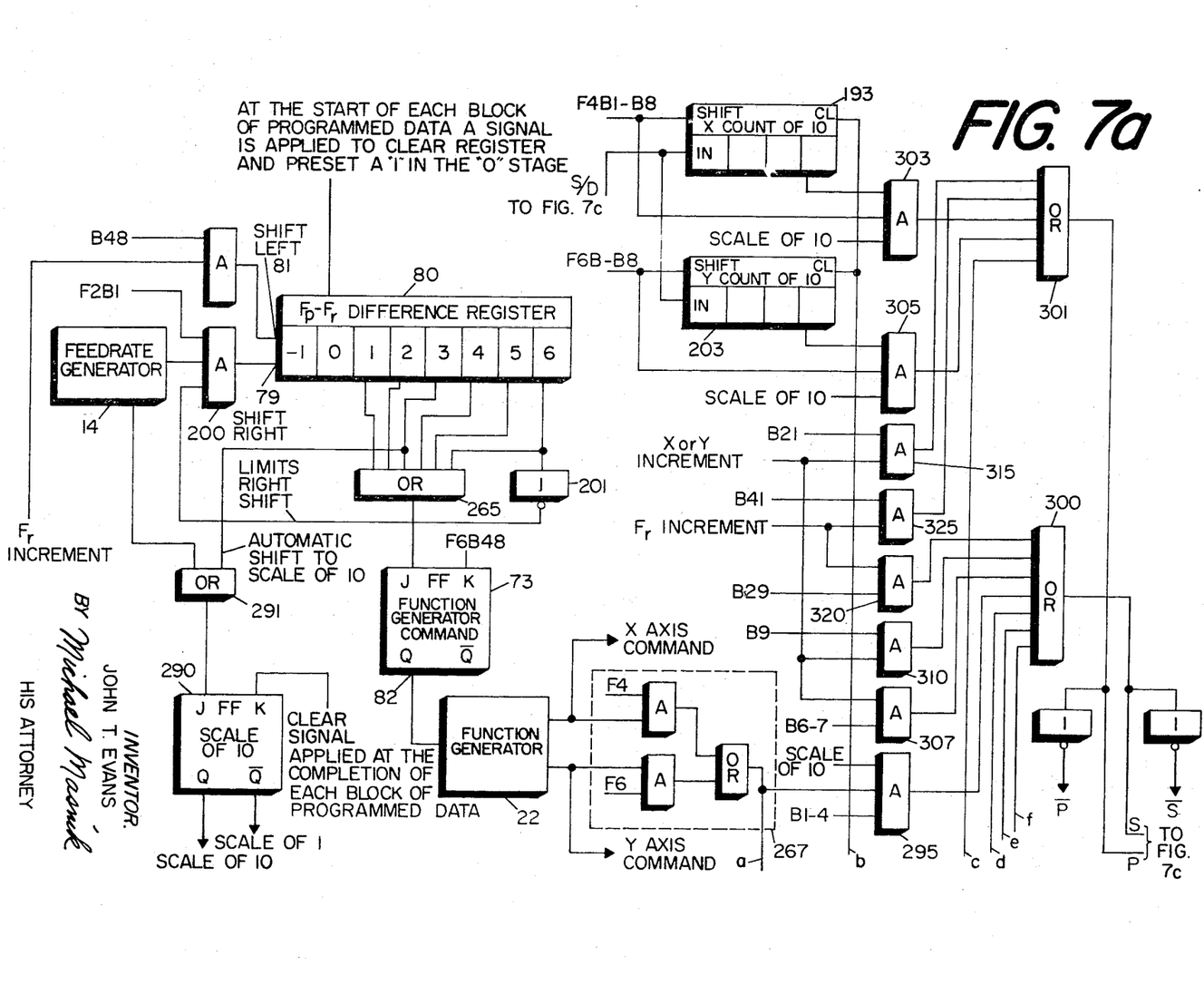
FIGS. 7a–7c are detailed schematic diagrams of the circuit of one form of the present invention which is represented by FIG. 4.
Figure 7B:
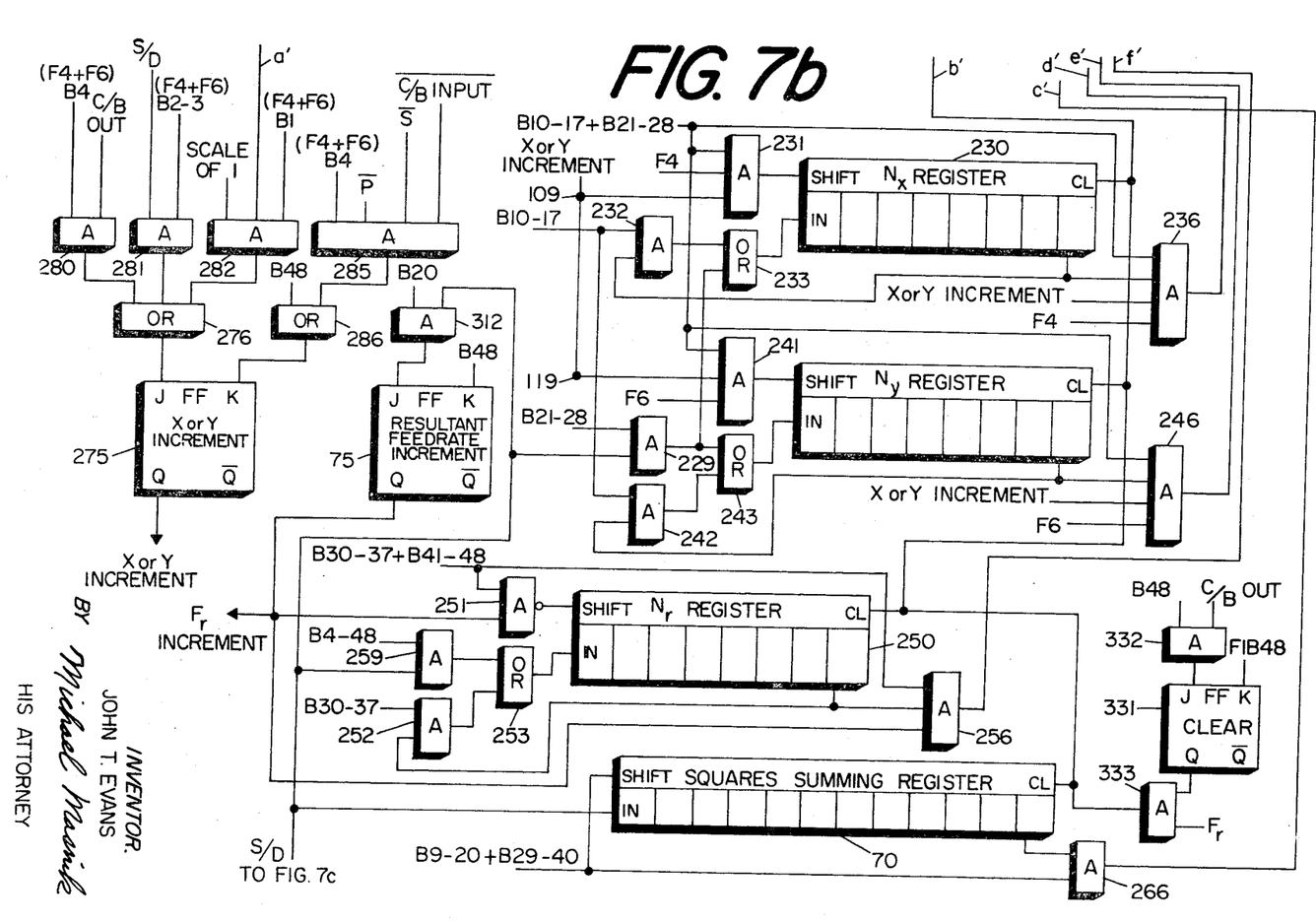
Figure 7C:
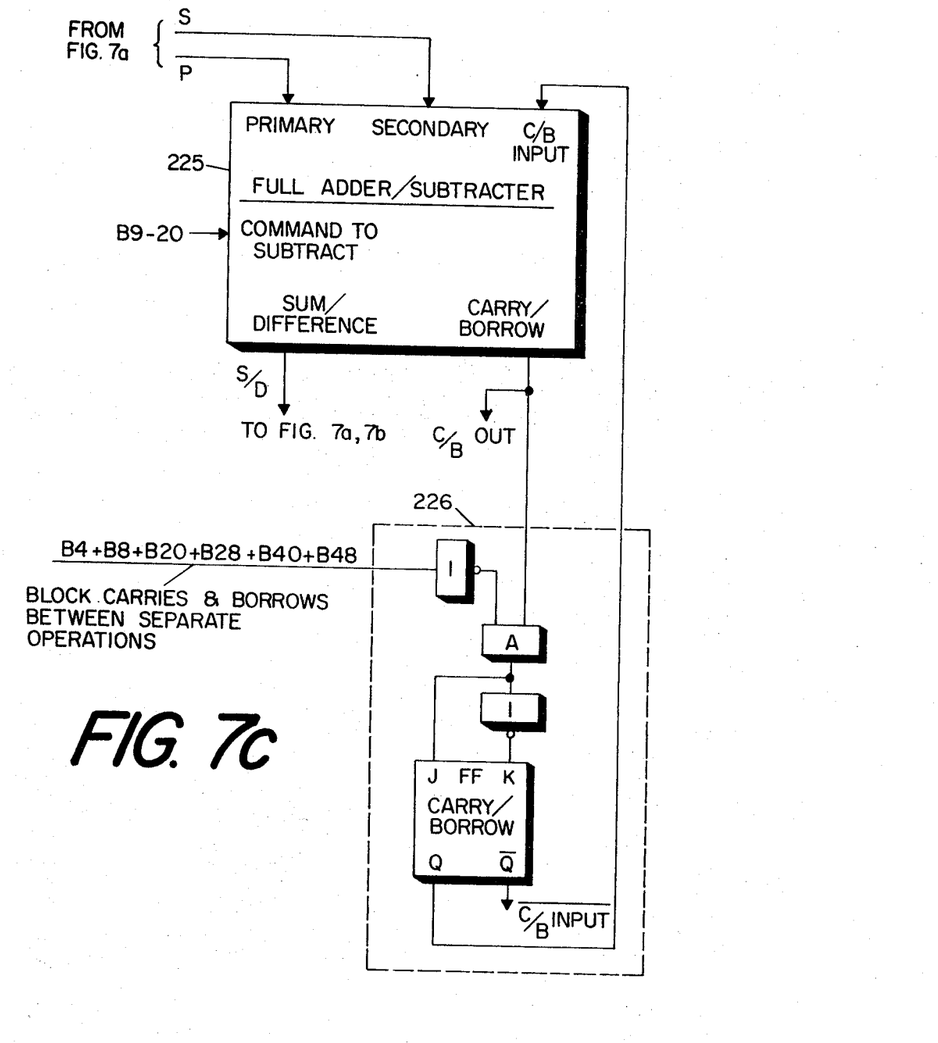

The squaring circuits 64, 65 and 66 which are functionally represented in FIGS. 3 and 4 are identical in construction and operation, and are therefore analyzed with respect to the X squaring circuit 64. The squaring circuitry may take the form shown in FIG. 7 or may be implemented by other means. (For example, see page 95, Control Engineering Magazine, March 1962). As explained above, the squaring circuits 64, 65 and 66 provide a means by which a number will be provided in the summing register 70, which number is indicative of an error between the programmed velocity and the resultant of the individual axis commanded velocities. The complete arithmetic operation of the circuit is explained with respect to FIG. 5. Here, the contribution of each of the squaring circuits 64, 65 and 66 is explained.

During a cutting operation, successive $F_x$ increments are received at an input terminal 109 of the squaring circuit 64, each increment being indicative of an increment of commanded motion. A calculated number must be subtracted from the summing register 70 for each $F_x$ increment applied to the terminal 109. Thus, after $n+1$ increments are applied, the total number subtracted from the summing register is to be $(n+1)^2$. In order to perform this operation, the squaring circuit 64 utilizes the algorithm that the square of a number is the sum of that number of odd integers. For example, the square of 2, which is 4, is equal to the sum of the first two odd integers 1 and 3. The square of 3 is equal to the sum of the first three odd integers 1, 3, and 5, or 9. For each increment applied to the input terminal 109, the squaring circuit 64 provides another odd integer for subtraction from the summing register 70 so that the total number subtracted is at all times equal to the square of the number of $F_x$ increments which have been produced at any given time during a computational interval.

Mathematical Operation of the Circuit

Figure 5A:
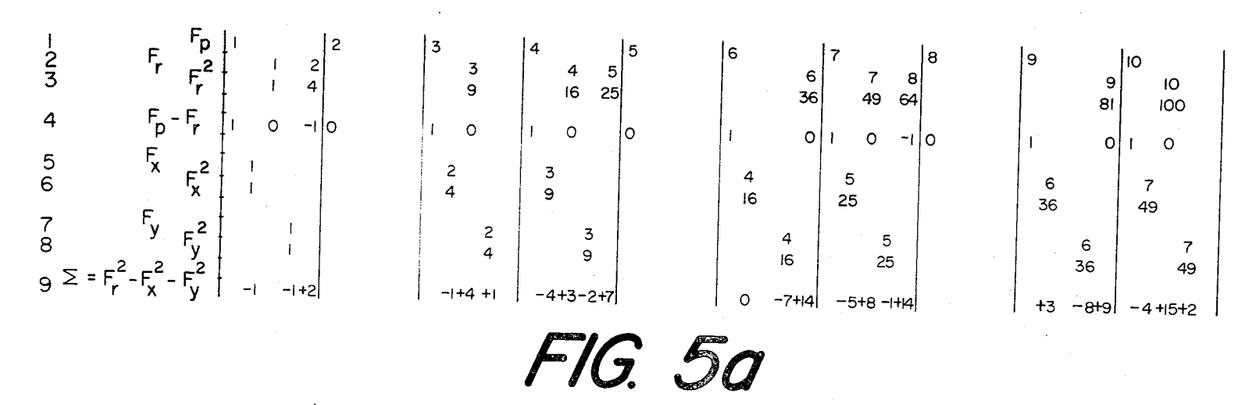
FIGS. 5a and 5b are arithmetic charts demonstrating the operation of the embodiments shown in both FIGS. 3 and 4; and also of the embodiment of FIGS. 7a–7c.
Figure 5B:
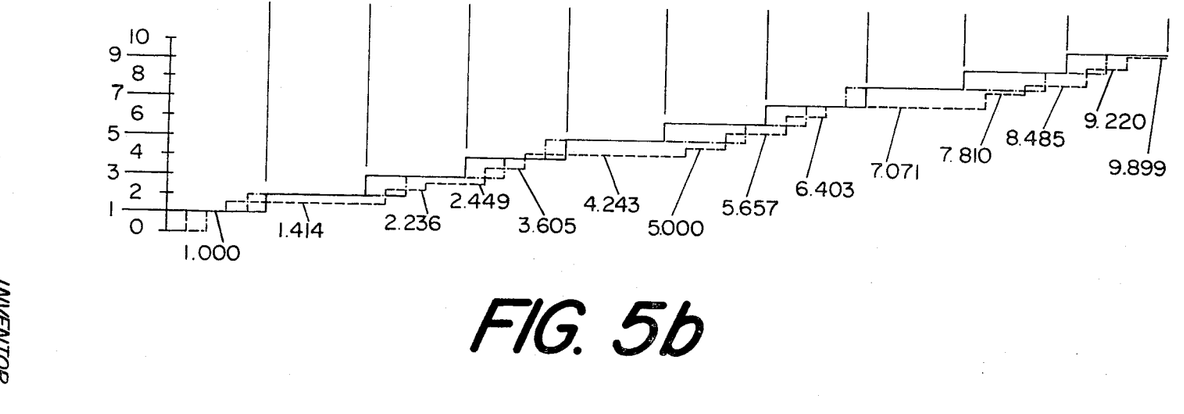

FIG. 5 is an arithmetic chart illustrating the mathematical operation of the circuit of FIG. 4 for scale of one operation. FIG. 5a is a chart indicating the operations performed within the direct feed rate control circuit 10, and FIG. 4b is a graph illustrating the relative magnitudes of $F_p$, the programmed motion, $F_r$, which is the composite signal produced by the resultant increment generator 75, and $\sqrt{F_x^2 + F_y^2}$, which is equal to the resultant of the components of motion being commanded along the individual axes and is indicative of the commanded velocity. FIGS. 5a and 5b are each divided into ten columns representing the operation following the incidence of each $F_p$ pulse. Each column is referred to by the number of the $F_p$ pulse with which it begins.

At the commencement of a computational interval a first $F_p$ pulse (column 1, line 1, FIG. 5a) is delivered to the difference register 80 from the feed rate generator 14 (FIG. 4). Thus a 1 is held in the difference register 80. Since no pulses have been yet supplied to the resultant increment generator 75, a zero input is applied to the input terminal 81 of the difference register 80. The number in the difference register is 1 minus 0, or 1. When the number in difference register 80 is positive, an output appears at the output terminal 82 of the difference register 80. This output comprises the iterative command signal which is applied to the function generator 22.

The function generator 22 is capable of producing $F_x$ and $F_y$ pulses when an iterative command signal is applied thereto. The numbers of $F_x$ and $F_y$ pulses which are produced are functions of data in the function generator 22 which will have been supplied by the data input unit 15. For purposes of illustration, let it be assumed that the programmed motion is a slope at an angle of 45° with respect to the X axis, and scale of one operation is utilized. In this example, the X and Y components of motion of the automatic machine tool are equal. Therefore, the function generator 22 iterates to provide equal numbers of X and Y axis command pulses. Since scale of one operation is utilized, the function generator 22 provides output increments of one pulse at a time. Thus, when the first $F_p$ input pulse is received by the difference register 80, and an iterative command signal is provided, a first $F_x$ pulse is produced (column 1, line 5, FIG. 5a), and a first $F_y$ pulse is produced (line 9).

As will be explained with respect to FIG. 6, the direct feed rate control circuit 10 first operates on the X information and then on the Y information. The $F_x$ pulse is coupled through the scale control circuit 85 (FIG. 4) to the squaring circuit 64. After each successive $F_x$ pulse is produced, the squaring circuit 64, as previously described, provides a number $2n_x + 1$ for subtraction from the squares summing register 70, where $n_x$ is the number of $F_x$ pulses previously produced during the computational interval. Thus, after the first $F_x$ pulse is produced, $2 \cdot 0 + 1$, or 1 is provided for subtraction from the squares summing register 70. The term $F_x$ by itself is used to denote the integral of the number of $F_x$ pulses which have been supplied during the computational interval. As has been described, the total of the number provided by the squaring circuit 66 to the squares summing register 70 is equal to $F_x^2$. The terms $n$ and $F$ followed by the subscripts $y$ and $r$ respectively denote the corresponding quantities for the $F_y$ and $F_r$ pulses.

As seen in column 1, line 6 of FIG. 5a, $F_x^2$ equals 1. This value is subtracted from the number in the squares summing register 70, which is 0, to get a result of minus 1 (line 9). The circuit is arranged so that when the squares summing register 70 contains a negative number, the resultant increment generator 75 produces an increment, so that $F_r$ equals 1 (column 1, line 2). A first $F_r$ pulse is provided to the squaring circuit 66. Consequently, the squaring circuit 66 provides a number $2n_r + 1$, or 1, for addition to the squares summing register 70, and the resulting total in the squares summing register is 0. The $F_y$ information is acted upon next. As seen in line 7, $F_y$ equals 1. Thus $2n_y + 1$, or 1 is provided by the squaring circuit 65 for subtraction from the number in the squares summing register 70, to give a result in the squares summing register 70 of minus 1 (line 9). Thus another increment is produced by the resultant increment generator 75 as seen in the right-hand side of column 1 in line 2. $F_r$ now equals 2 and the squaring circuit 66 provides $2n_r + 1$, or $2 \cdot 1 + 1$, or 3 to the squares summing register 70 to provide a total of 2 therein (line 9).

The output of the resultant increment generator 75 is also coupled to the input terminal 81 of the difference register 80 so that the number of $F_r$ pulses produced is subtracted from the number of $F_p$ pulses produced. At the end of the above described operation which occurs after the first $F_p$ pulse, the number in the difference register 80 is negative.

Therefore, no iterative command signal is provided at the output terminal 82 of the difference register 80. The function generator 22 is inhibited from iterating until the number in the difference register 80 again becomes positive. Thus the direct feed rate control circuit 10 operates as a closed loop system to force $F_r$ to be equal $F_p$. The effect of this operation is illustrated in FIG. 5b. The progress of $F_r$ is contrasted to increments of $F_p$ is plotted. In addition $\sqrt{F_x^2 + F_y^2}$ is plotted to illustrate the resultant of the motion that is being commanded along the individual axes as a result of the above-described operation.

Returning to FIG. 5a, as seen in column 2 in which the second $F_p$ pulse is produced, no $F_x$ pulses or $F_y$ pulses are produced during this period since no iterative command signal is applied to the function generator 22. Upon the occurrence of the third $F_p$ pulse, the number in the difference register 80 becomes positive and $F_x$ and $F_y$ increments are produced. Operation continues as described with respect to column 1 in the same manner. An $F_r$ is generated which is at all times nearly equal to $F_p$. It should be noted that $F_r$ is never more than one increment away from $F_p$. Thus as the numbers in the various registers become larger, the percent error of commanded velocity decreases. The computational interval may be made as long as desired. Its size is only limited by the length of registers desired to be included in the circuit. Extremely good accuracy of velocity in practical operation can be provided with relatively short registers. For example, utilizing a register eight bits long provides an error of less than one-half percent at the end of a computational interval.

Direct Feed Rate Control Circuitry

FIG. 6 is a waveform chart illustrative of particular timing signals produced by the timing unit 12 (FIG. 2) which will be referred to as function timing signals. The function timing signals have fixed relationships in time to each other, and enable performance of successive operations within the numerical control circuit. Six function timing signals, F1–F6, which each respectively define function times, also referred to as F1–F6, and together comprise a timing unit sequence, are illustrated. Any desired operations may take place during any one of the function times. For example, in the present arrangement the feed rate generator 14 operates during the function time F1. The function generator 22 is capable of producing $F_x$ pulses during the function time F3 and $F_y$ pulses during the function time F5. $F_x$ pulses are operated upon by the squaring circuit 66 and squares summing register 70 during function time F4, and $F_y$ pulses operated upon by the squaring circuit 65 and squares summing register 70 during function time F6. It should be remembered that the function timing signals F1–F6 are cyclically reproduced. Each function time has a duration equal to the time during which a certain number of clock pulses are produced. The function times F1–F6 do not necessarily have the same duration, although any one function time will have the same duration every time it occurs. F4, which will be illustrated in greater detail in FIG. 8, has a duration which consists of 48 timing periods occurring between times $t_0$–$t_{48}$, and during which 48 timing pulses, or bits, denoted B1–B48 are produced. The duration of $B_1$ is from $t_0$–$t_1$. This duration begins after the $t_0$ timing pulse and includes the timing pulse $t_1$. Similarly, the point in time within a function time at which each bit ends comprises the numeral following the term B.

The direct feed rate control circuit 10 is described with respect to FIG. 7, which is a schematic illustration of the direct feed rate control circuit 10 included in a numerical control circuit. FIG. 8 illustrates the operation of certain elements of the circuit of FIG. 7. FIG. 9 is a detailed timing diagram of operations within the function time F4. It is noted that the timing diagram for operations within F6 is identical to that which is illustrated in FIG. 9.

Referring now to FIG. 7, the same reference numerals are used to denote actual circuit elements which have been illustrated in FIGS. 2–4. Some of the basic circuit elements of FIG. 7 are described prior to the analysis of the circuit's operation. The inputs applied to each of the circuit elements are denoted in FIG. 7. FIGS. 7, 8, and 9 fully illustrate the operation described below.

The difference register 80 to which the output of the feed rate generator 14 is delivered via an AND gate 200, is an eight-stage shift register having successive stages which are assigned values of −1 through +6. During the F1 function time (FIG. 6) at the start of operation on a programmed block of data, "1" is preset into the zero position so that the number in the difference register is 0. The term "1" in quotation marks is used to denote a logic level and is distinguished from the numerical value of 1. The AND gate 200 has a timing input to provide an input to the difference register 80 at an appropriate time, for example at F2B1. Input pulses to the input terminal 79 shift the "1" in the difference register 80 one place to the right so that the number in the shift register is indicative of one number higher than it was before the input pulse. An inverter 201 is connected between the bit of the difference register 80 assigned the highest value and another input of the AND gate 200 to inhibit a shifting of the "1" to the right which would result in clearing the difference register 80 in the case of an excessive programmed velocity. Similarly, an input pulse to the input terminal 81 shifts the "1" in the difference register 81 one place to the left to provide the effect of subtracting 1 from the number in the difference register 80. As explained with respect to FIG. 5, the number in the difference register 80 will never be less than −1. Appropriate limit circuitry (not shown), however, may be provided to limit the shifting to the left of the "1" out of the difference register 80.

The scale of 10 circuit denoted by the reference numeral 85 in the representation of FIG. 4 includes a shift register 193, which performs a function similar to the pulse divider 93 of FIG. 4 for use during an appropriate time. Similarly, a shift register 203 is provided to function in a manner similar to that of the divider 103 of FIG. 4, and at a portion of the F6 function time the adder/subtractor 225 comprises a portion of the scaling circuit 86 of FIG. 4. The circuitry functionally represented by the squaring circuits 64, 65 and 66 respectively include an $n_x$ shift register 230, an $n_y$ shift register 240 and an $n_r$ shift register 250. During appropriate times during the F4 function time and F6 function time, each of these shift registers is included in one of the squaring circuits 64, 65 and 66 along with the adder/subtractor 225. The shift registers 193, 203, 230, 240 and 250, as well as the squares summing register 70 each comprise a shift register having a first input for delivering a "1," illustrated as a lower input terminal in FIG. 7, to the stage illustrated at the left-hand side and a second input illustrated as an upper input terminal in FIG. 7 for shifting that "1" to the right. They also comprise output terminals and clearing inputs. The number in each of these shift registers is characterized by the position of "1's" in the stages of the shift register, the most significant digit of the binary number being contained in the stage at the left. In other words, the "0's" and "1's" contained in each shift register, when read from left to right, comprise the number therein in binary form.

An AND gate 231 is connected to the shift input of the shift register 230. AND gates 229 and 232 are each coupled to the first input of the shift register 230 by an OR gate 233. Similarly, AND gates 241 and 251 are connected to the inputs of the shift registers 240 and 250 respectively. AND gates 229 and 242 are coupled by an OR gate 243 to the first input of the shift register 240. AND gates 259 and 252 are coupled to the first input of the shift register 250 by an OR gate 253. Each of the above-described gates couple hereinafter-described inputs to the shift registers 230, 240, and 250 at appropriate times. AND gates 236, 246, 256, and 266 respectively couple the outputs of the registers 230, 240, 250, and 70 to further circuitry when provided with appropriate timing inputs and other inputs described below and illustrated in FIG. 9.

The adder/subtracter 225 is a well-known logic circuit having primary, secondary and carry/borrow, or C/B, inputs and sum/difference, or S/D, and a carry/borrow, or C/B, output. The adder/subtracter 225 adds or subtracts, depending on a preparatory command signal supplied thereto, in accordance with the truth table illustrated in FIG. 8a. The carry/borrow output is supplied to a delay means 226 and comprises the C/B input for the next step of one adding or subtracting operation. Appropriate timing pulses are provided to the delay means 226 to block the provision of a C/B output of one adding or subtracting operation as the C/B input for a separate operation. Each of the stages of the difference register 80 representative of a positive number is coupled by an OR gate 265 to the iterative command flip-flop 73. The iterative command flip-flop 73 as well as flip-flops hereinafter described of the present specific embodiment comprise J, well-known J–K flip-flops. The J–K flip-flop comprises J, K, and clock input terminals and Q and $\bar{Q}$ outputs and operates in accordance with the truth table of FIG. 8b. The $\bar{Q}$ output is the complement of the Q output. In the circuit of FIG. 7, each of the flip-flops is continually supplied with clock pulses from the timing unit 12. For simplicity of the drawing, the clock terminals of the flip-flops of FIG. 7 are not illustrated. The term "provide an output" to a flip-flop in the context of FIG. 7 refers to the provision of a "1" to its J input terminal. The term "provide a resetting pulse" refers to a provision of "1" to its K input terminal.

When a positive number is in the difference register 80, a "1" is provided to the J input of the flip-flop 73. This results in an iterative command signal appearing at the output terminal 82 of the flip-flop 73. The iterative command signal remains at the output terminal 82 until a resetting pulse is applied to the K input of the flip-flop 73 at the end of a timing unit sequence, for example, F6B48.

The iterative command signal is provided to the function generator 22 which provides $F_x$ and $F_y$ pulses in the manner hereinbefore described. Appropriate gating circuitry 267 is provided to supply, during function time F4, $F_x$ pulses which may occur, and to supply, during function time F6, $F_y$ pulses which may occur. In scale of one operation, the $F_x$ and $F_y$ pulses comprise single pulses and in scale of ten operations, the $F_x$ and $F_y$ pulses comprise four bit binary coded numbers. The function generator 22 of the specific embodiment disclosed operates so as never to produce binary coded numbers having a value of greater than 10.

Further reference to the construction and operation of the direct feed rate control circuit 10 is made with respect to FIG. 9, which illustrates operation during the function time F4, as well as with respect to FIG. 7. Operation during function time F6 is identical to that during function time F4. Provision of $F_x$ pulses in scale of one or scale of ten operation for coupling to squaring circuitry is accomplished within the interval B1-B4 of function time F4.

The individual axis command pulse trains comprising the $F_x$ and $F_y$ increments for coupling to the squaring circuitry are provided from an increment flip-flop 275 which has an OR gate 276 connected to provide inputs thereto from AND gates 280, 281, and 282. The AND gate 282 couples inputs to the increment flip-flop 275 in scale of one operation, and the AND gates 280 and 281 serve functions described below. Also functioning as described below are an AND gate 285 which is coupled to an OR gate 286 for providing resetting pulses to the flip-flop 275.

Scale of operation selection is made by a scaling flip-flop 290 which has its J input terminal coupled to both the feed rate generator 14 and one stage of the difference register 80 via an OR gate 291. Any stage of the difference register 80 assigned a value greater than 1 may be chosen, and the stage assigned the value 3 is chosen here for optimal operation. Upon occurrence of the conditions for scale of ten operation, a "1" is supplied to the J terminal of the scaling flip-flop 290, so that it provides a "1" at its Q output terminal, which comprises a scale of 10 signal. A resetting signal is applied the K input terminal of the scaling flip-flop 290 at the end of operation on each programmed block of data. In the absence of the conditions for scale of 10 operation, an "0" is supplied to the J input terminal so that a "1," which comprises a scale of one signal, appears at the $\bar{Q}$ terminal of the scaling flip-flop 290. This "1" is coupled to the AND gate 282 so that at an appropriate time, an input is provided to the increment flip-flop 275.

B1 is also connected to the AND gate 282. Upon occurrence of B1, all three inputs of the And gate 282 are of a "1" level, and the increment flip-flop 275 provides an output at its Q terminal. The output of the increment flip-flop 275 is connected to points 109 and 119.

Since the timing information represented in the B1-B8 interval in FIG. 9 utilized in explaining scale of 10 operation is a "don't care" situation for a scale of one operation, the interval B1-B8 may be discussed first with respect to scale of ten operation, and next with respect to scale of one operation.

Provision of an output in scale of 10 operation from the increment flip-flop 275 is accomplished in a different manner. In the scale of 10 operation, the output of the function generator 22 comprises a serial binary coded number which is supplied to an AND gate 295 to which the scale of 10 signal and B1-B4 are also applied. The output of the function generator 22 is coupled via an OR gate 300 to the secondary input of the adder/subtracter 225. At the same time, the binary digits in the four stages of the shift register 193 are serially shifted in response to B1-B4 through an AND gate 303 and an OR gate 301 to the primary input of the adder/subtracter 225. B1-B4 are provided to the shift input terminal of the shift register 193 and to the AND gate 303, to which the scale of 10 signal is also provided. During the function time F6, the binary digits in the shift register 203 are similarly shifted through an AND gate 305 also connected to the OR gate 301. When this operation occurs at the beginning of operation on a block of data, the numbers shifted from the shift register 913 to the adder/subtracter 225 are 0.

Figure 8A:
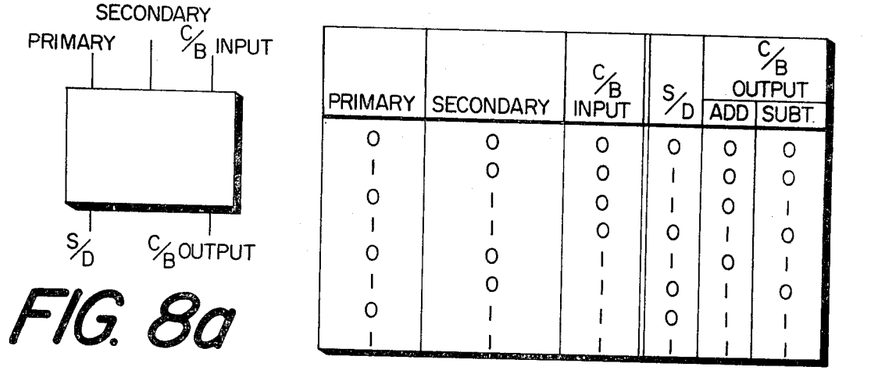
FIGS. 8a and 8b are truth tables illustrating the operation of the adder/subtracter and J–K flip-flops of FIGS. 7a–7c.
Figure 8B:
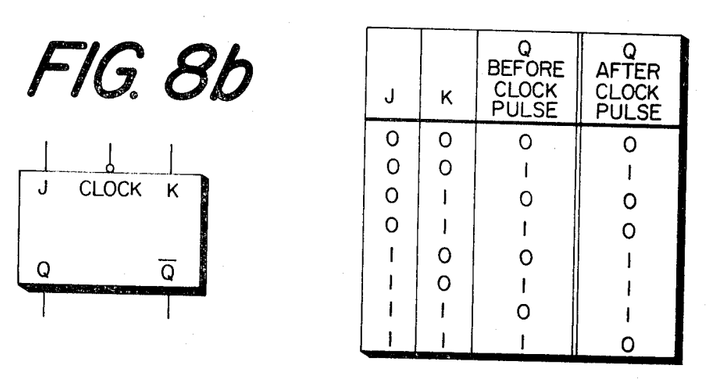
Figure 9:
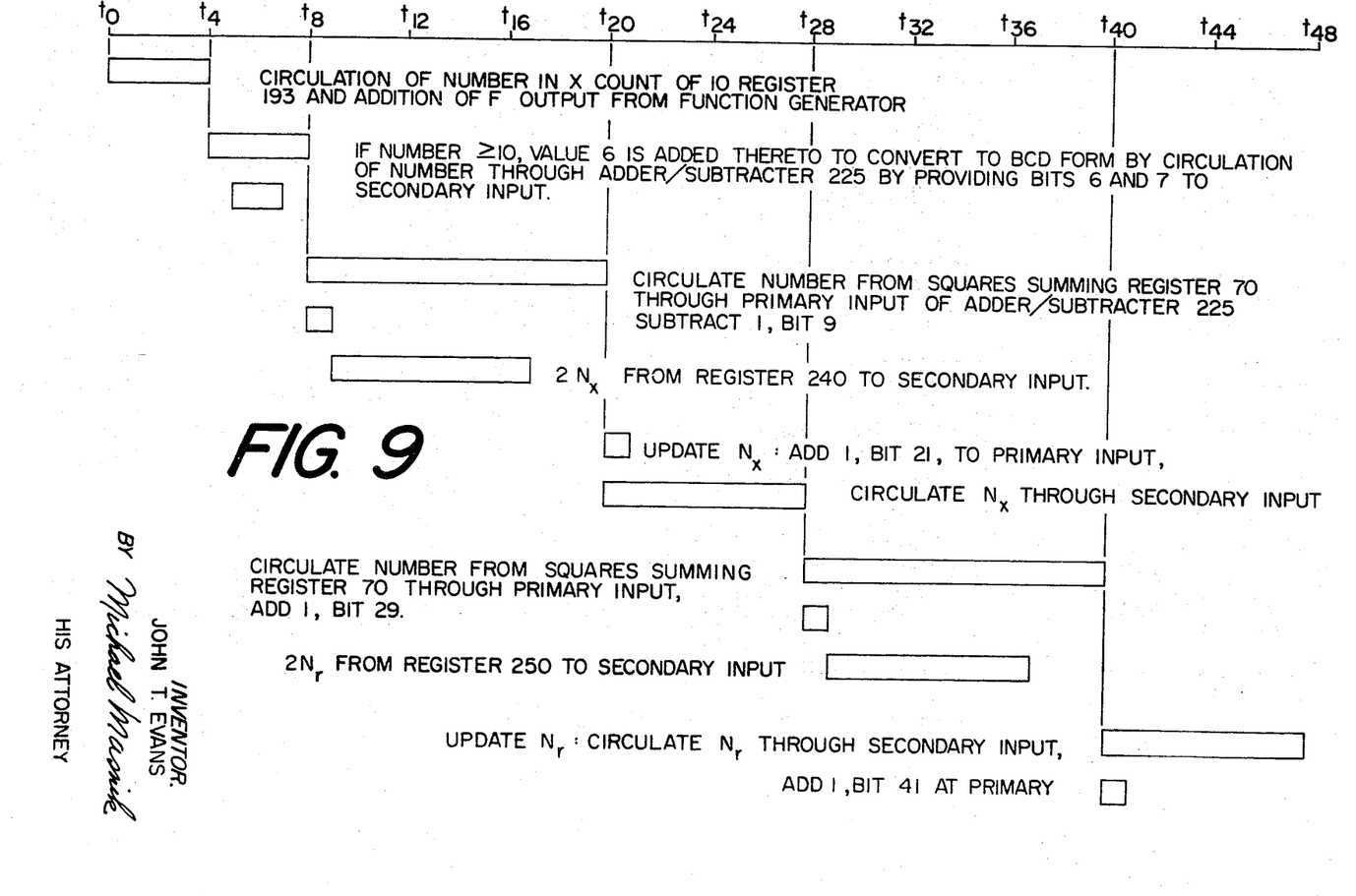
FIG. 9 is a timing chart illustrating the movement of data within the circuit of FIGS. 7a–7c.

The adder/subtracter 225 operates serially on the successive corresponding digits of the number produced by the function generator and the number from the shift register 193 in the manner described in the truth table of FIG. 8a. The S/D output is coupled back into the shift register 193. Thus at B5 time, the number in the shift register 193 is equal to the coded number which was supplied by the function generator 22. It is now desired to provide an $F_x$ pulse from the X or Y increment flip-flop 275 if the addition of the number, which was in the shift register 193, to the number supplied by the function generator 22 is greater than or equal to 10. There are two situations in which this could occur. The first is if the previously described sum is greater than 15, thus exceeding the capacity of the four stage shift register 193. The second is if the number in the shift register 193 is between 10 and 15. In the first situation, a "1" is present at C/B output of the adder/subtracter 225 at B4 time. This "1" is sensed by coupling B4 and the C/B output to the AND gate 280 which provides an input to the increment flip-flop 275. The impending presence of a number in the shift register 193 which will be greater than 10 at B5 time is checked by sensing the value of its most significant digits. Since the numbers from the S/D output of the adder/subtracter are in order of least significant digit first, by coupling the S/D output and B2 and B3 to the AND gate 281, the increment flip-flop 275 is provided with an input to set at B2 or B3 time if the values of 2 or 4 are included in the number in the shift register 193. At B4 time, B4 and the complements of the primary, secondary and C/B inputs are applied to the AND gate 285. If the inputs to the AND gate 285 are indicative of a value of zero in the most significant digit, so that the number in the shift register 193 at B5 time will not be at least 10, the AND gate 285 provides an output via the OR gate 286 to reset the increment flip-flop 275. If the most significant digit of the number which will be present in the shift register 193 at B5 time is one, the increment flip-flop 275 is not reset. An X increment is produced which remains at the Q terminal of the increment generator 275 until B48 is supplied via the OR gate 286 to reset it.

During the B4-B8 interval, the number 6 in binary form is added to the number in the X count of 10 shift register 193 to convert the number to BCD form, if the result of the previously described addition was greater than or equal to 10. This is done by serially circulating the number of the shift register 193 through the adder/subtractor 225 in serial fashion and providing "1's" for addition to the second and third most significant binary digits of that number. The "1's" comprise B6 and B7 provided to an AND gate 307 which is gated by the output of the increment flip-flop 275. The "1's" are coupled by the OR gate 300 to the secondary input of the adder/subtracter 225. Thus, at B9 time, the number in the shift register 193 is in BCD form and any scale of 10 output from the function generator 22 may be added thereto when function time F4 of the next operating sequence begins.

The operation of subtracting $F_x^2$ from the number in the squares summing register 70 begins at B9 time. As explained with respect to FIG. 5, this is done by subtracting $1 + 2 n_x$. At B9 time, the adder/subtracter 225 is commanded to subtract, and timing signals B9-B20 are supplied to the shift input of the squares summing register 70 so that the binary digits contained in the squares summing register 70 are supplied serially via the OR gate 301 to the primary input of the adder/subtracter 225. The value 1 is subtracted from the number in the summing squares register 70 by providing B9 to one input of an AND gate 310 which has its other input connected to the output of the increment flip-flop 275. The value 1 is thus provided at the secondary input of the adder/subtracter 225 for subtraction from the least significant digit of the number in the squares summing register 70. B10-B17 are connected to the shift input of the $n_x$ register 230 to serially supply the binary digits in the $n_x$ register 230 to the secondary input of the adder/subtracter 235 via the OR gate 281. Since each binary digit in the number $n_x$ is subtracted from a binary digit representative of one binary order of magnitude greater than that number from times B10–B16, a value of $2n_x$ is subtracted from the number is the squares summing register 70.

The subtraction may be completed at B16 time. If, however, there is a "1" at the C/B output of the adder/subtractor 225 at B16 time, the subtraction may continue as the number from the squares summing register 70 continues to circulate until B20 time. If the result of the above-described subtraction is negative, the most significant digit of the result will be a "1" appearing at the S/D output of the adder/subtracter 225 during B20 time. The presence of a negative result is sensed by connecting the S/D output of the adder/subtracter 225 to one input of an AND gate 312 which is connected to the input of the resultant increment generator flip-flop 75. B20 is provided to the other input of the AND gate 312. The resultant increment generator flip-flop 75 provides a "1" output at its Q terminal in response to a negative result. This "1" comprises an $F_r$ increment. If the result is positive, the most significant digit of the number of the squares summing register 70 is a "0," and no $F_r$ increment is produced. Thus at B20 time, the subtraction has been completed and the number of the summing squares register has been shifted back into the summing squares register 70. If the result of the subtraction was negative, an $F_r$ increment has been produced.

It should be noted here that the squares summing register 70 is made 12 bits long in the specific embodiment of FIG. 7. The squares summing register may be any length as long as it is a sufficient length so that a "1" in the most significant digit thereof can result only from a subtraction having a negative result, and cannot result from the adding of numbers into the squares summing register 70.

Now that the subtraction has been completed, the value of $n_x$ in the $n_x$ register 230 must be updated so the proper value of $n_x$ will be present therein at function time F4 of the next timing unit sequence. The number in the $n_x$ register 230 is updated by adding the value 1 thereto. Starting at B21 time, the adder/subtracter 225 is given the command to add. The value 1 is provided to the primary input of the adder/subtracter 225 via the OR gate 301 from an AND gate 315 having its first input connected to the output of the increment flip-flop 275 and a second input to which bit 21 is provided. B21–B28 are provided to the shift input of the $n_x$ register 230. The value 1 is added to the least significant digit of the number representative of $n_x$, which is circulated and returned into the $n_x$ register 230.

At B29–B48 time, no command to subtract is given to the adder/subtracter 225, and it adds. The value $1 + 2n_r$ is added to the number in the squares summing register 70. The value 1 to be added is provided to the secondary input of the adder/subtracter 225 via the OR gate 300 from an AND gate 320 having its first input connected to the Q terminal of the resultant increment flip-flop 75 and having B29 provided to its other input.

B29–B40 are connected to the shift input of the squares summing register 70. B30–B37 are supplied to the shift input of the $n_r$ register 250. Thus the value 1 is added to the least significant digit of the number of the squares summing register 70, and the digits of $n_r$ are serially added to the successively next least significant digits of the number of the squares summing register 70. Consequently, a value $2n_r$ has been added to the number in the squares summing register 70. As a result, a total of $1 + 2n_r$ has been added to the squares summing register 70.

At B41 time, updating of the number in the $n_r$ register 250 begins. B41 is provided to the first input of an AND gate 325 having its other input connected to the Q output of the resultant increment generator flip-flop 75 to provide the value 1 for addition at the primary input of the adder/subtracter 225 at B41 time. B40–B48 are provided to the shift input of the $n_r$ register 250 so that a 1 is added to the least significant digit of the binary number representing $n_r$, and the updated value of $n_r$ is returned to the shift register 250 via its first input terminal. The new value of $n_r$ is stored therein for the beginning of function time F6 during which the Y information is operated upon.

At B48 time the increment flip-flop 275 and the resultant increment generator flip-flop 75 are reset. B48 is connected to the reset input of flip-flop 75 and coupled by the OR gate 286 to the reset input of the flip-flop 275.

During function time F6 the identical operation is repeated with the Y count of 10 register 203 providing outputs via the OR gate 301 to the primary input of the adder/subtracter 225 at the appropriate times, as illustrated in FIG. 9, and the $n_y$ register 240 providing outputs at appropriate times via the OR gate 300 to the secondary input of the adder/subtracter 225.

Operation continues as described through successive timing unit sequences. When the count in the $n_r$ register 250 reaches its capacity, this condition is sensed during the updating operation by the presence of a "1" at the C/B output of the adder/subtracter output 225 at B48 time. B48 and the C/B output are coupled to the inputs of an AND gate 332 having its output connected to set a "clear" flip-flop 331. This can occur during function time F4 or F6. If clear flip-flop 331 is set, it provides an output during function time F1 to the clearing inputs of the registers 230, 240, 250 and 70, which again start from zero. This output is provided from an AND gate 333 having inputs comprising F1 and the flip-flop 331 output. B48 is coupled during function time F1 to reset the clear flip-flop 331. Using registers of the length illustrated in the embodiment of FIGS. 7a–7c, the round-off error due to clearing of the registers and starting of counting again will result in an error of less than one-half of 1 percent in the commanded velocity.

Conclusion

The present invention thus comprises a direct feed rate control circuit which controls the average rate at which the iterative operation of a function generator occurs to provide individual axis command pulses. While the specific embodiment illustrated controls commanded velocities along two orthogonal axes, a similar circuit could be constructed to provide three individual axis command pulse trains. Circuitry similar to that of FIGS. 7a–7c could be provided to implement the embodiment of FIG. 3. The representations of FIGS. 3 and 4 should suggest to those skilled in the art many ways of implementing the present invention apart from the specific circuitry of FIGS. 7a–7c.

Finally, while in the specification and claims the square of the programmed velocity or the square of the resultant commanded velocity were added to the number stored in the squares summing register while the squares of the individual axis commanded velocities were subtracted from the number stored in the squares summing register, applicant intends this language to also mean that the addition and subtraction requirements for the various velocities may be reversed.

What is claimed as new and desired to be secured by Letters Patent of the United States is:

1. In a numerical control system for controlling the relative positioning of two objects, velocity control means for providing, in response to a velocity command signal having a pulse rate indicative of a programmed velocity, an iterative command signal for commanding the iteration of a function generator to provide a plurality of individual axis motion command signals, each having a pulse rate indicative of a component of a commanded velocity, comprising in combination:

a. a plurality of first register means, each responsive to a respective axis command signal for storing a number therein indicative of the motion commanded along an axis;

b. second register means coupled to said velocity command signal for storing a number therein indicative of the programmed motion;

c. a squares summing register;

d. adding/subtracting means coupled between each of said first register means and said squares summing register and between said second register means and said squares summing register for providing numbers for subtraction from the number stored in said squares summing register indicative of the square of motion commanded along an axis and for providing a number indicative of the square of programmed motion for addition to the number stored in said squares summing register, whereby the number appearing in said squares summing register at any time is indicative of the difference between the programmed and commanded velocities at that time, said adding/subtracting means being responsive to an input pulse supplied to any register means to operate on the number in said register means to provide a number $2n+1$ from said register means to said squares summing register, where n is the number in said register means remaining from a prior storage operation, said adding/subtracting means further operating to increase the number in said register by one; and e. means for producing the iterative command signal when the number in said squares summing register is of a predetermined sign.

2. A velocity control means according to claim 1 in which said means responsive to the number in said squares summing register comprises a bistable switching means having an input coupled to said squares summing register and an output coupled to said function generator.

3. An arrangement according to claim 1 comprising means responsive to the second register storing a number larger than a predetermined number for clearing all of said registers.

4. In a numerical control system for controlling the relative positioning of two objects, velocity control means for providing, in response to a velocity command signal having a pulse rate indicative of a programmed velocity, an iterative command signal for commanding the iteration of a function generator to provide a plurality of individual axis motion command signals each having a pulse rate indicative of a component of a commanded velocity comprising in combination:

a. first register means each responsive to a respective axis command signal for storing a number therein indicative of the motion commanded along an axis;

b. second register means for storing a number therein indicative of a resultant commanded motion;

c. a squares summing register;

d. adding/subtracting means coupled between each of said first register means and said squares summing register and between said second register means and said squares summing register for providing numbers for subtraction from the number stored in said squares summing register each indicative of the square of motion commanded along an axis and for providing a number indicative of the square of said resultant commanded motion for addition to the number stored in said squares summing register, whereby the number appearing in said squares summing register at any time is indicative of the difference between the resultant commanded motion and the sum of the squares of the individual axis commanded motions at that time;

e. a resultant increment generator for producing said resultant commanded motion by providing an output having a pulse rate indicative of the commanded velocity, said resultant increment generator having an input coupled to said squares summing register and an output coupled to said second register means, said resultant increment generator producing an output when the number in said squares summing register is of a predetermined sign;

f. a difference register for storing a number therein having a first input responsive to said velocity command signal for adding a value of a first sign to the number therein and a second input coupled to the output of said resultant increment generator for adding a value to the number therein of a second sign, whereby the presence of a non-zero number in said difference register is indicative of a difference between the programmed and commanded velocities; and g. means responsive to the provided number in said difference register for producing the iterative command signal only when the number in said difference register is of a predetermined sign.

5. An arrangement according to claim 4 comprising means responsive to the second register storing a number larger than a predetermined number for clearing all of said registers.

6. A velocity control means according to claim 4 further comprising scaling means connected between each first register means and each individual axis command signal for selectively supplying to each of said first registers an input indicative of the motion commanded along an axis or an input indicative of a multiple of the motion commanded along an axis, and further comprising a bistable scale selection means having a condition responsive input and an output coupled to said scaling means for selecting the inputs to said first register means.

7. A velocity control means according to claim 4 in which said adding/subtracting means is responsive to an input pulse supplied to any register means to operate on the number in said register means to provide a number $2n+1$ from said register means to said squares summing register, where n is the number in said register means remaining from a prior storage operation, said adding/subtracting means further operating to increase the number in said register by one, and means for producing the iterative command signal when the number in said squares summing register is of a predetermined sign.

8. A velocity control means according to claim 7 in which each of said first register means and said second register means comprise binary shift registers, said adding/subtracting means comprises a serial binary adder/subtracter and gating means for serially circulating in a predetermined order the number in each of said first register means and said second register means simultaneously with the number in said squares summing register, adding the value 1 to the least significant digit of the number of said squares summing register, and adding to the remaining digits of the number of said squares summing register to the digits of the number being simultaneously circulated through said binary adder/subtracter.

9. A numerical control system for controlling the feed rate of a workpiece to an automatic machine tool, comprising in combination:

a. a feed rate generator for producing a velocity command signal having a pulse rate indicative of a programmed velocity;

b. a function generator for providing a plurality of individual axis command signals when enabled by an iterative command signal, each individual axis command signal being coupled to means for providing motion along a machine tool axis and having a pulse rate indicative of a component of commanded velocity;

c. first register means each coupled to an individual axis command signal for storing a number therein indicative of the motion commanded along an axis;

d. second register means for storing a number therein indicative of a resultant commanded motion;

e. a squares summing register;

f. adding/subtracting means coupled between each of said first register means and said squares summing register and between said second register means and said squares summing register for providing for subtraction from the number stored in said squares summing register each indicative of the square of motion commanded along an axis and for providing a number indicative of the square of programmed motion for addition to the number stored in said squares summing register, whereby a number is provided in said squares summing register indicative of the difference between the programmed and commanded velocities;

g. a resultant increment generator for producing an output having a pulse rate indicative of the commanded velocity having an input coupled to said squares summing register, and an output coupled to said second register means, said resultant increment generator producing an output when the number in said squares summing register is of a predetermined sign;

h. a difference register for storing a number therein having a first input coupled to said velocity command signal for adding a value of a first sign to the number therein and a second input coupled to the output of said resultant increment generator for adding a value to the number therein of a second sign, whereby the presence of a non-zero number in said difference register is indicative of a difference between the programmed and commanded velocities; and i. means responsive to the number in said difference register for producing the iterative command signal when the number in said difference register is of a predetermined sign.

* * * * *

UNITED STATES PATENT OFFICE
CERTIFICATE OF CORRECTION

Patent No. 3,657,525                 Dated April 18, 1972

Inventor(s) John T. Evans

It is certified that error appears in the above-identified patent and that said Letters Patent are hereby corrected as shown below:

Column 4, line 48, after "Y" insert -- error --; Column 6, line 69, after "ductive" insert -- . --; Column 10, line 4, "subtractor" should be -- subtracter --, line 11, "subtractor" should be -- subtracter --; Column 11, line 64, "subtractor" should be -- subtracter --, line 67, "subtractor" should be -- subtracter --; Column 12, line 45, "subtractor" should be -- subtracter --, line 73, "subtractor" should be -- subtracter --; Column 15, line 2, "tine" should be -- time --.

Signed and sealed this 26th day of December 1972.

(SEAL)
Attest:

EDWARD M. FLETCHER, JR.                          ROBERT GOTTSCHALK
Attesting Officer                                      Commissioner of Patents